US011955269B2

(12) United States Patent
Yoshizawa et al.

(10) Patent No.: US 11,955,269 B2
(45) Date of Patent: Apr. 9, 2024

(54) MANUFACTURING METHOD OF COIL COMPONENT

(71) Applicant: TAIYO YUDEN CO., LTD., Tokyo (JP)

(72) Inventors: Takanori Yoshizawa, Takasaki (JP); Kenji Watanabe, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 661 days.

(21) Appl. No.: 17/151,024

(22) Filed: Jan. 15, 2021

(65) Prior Publication Data

US 2021/0134519 A1 May 6, 2021

Related U.S. Application Data

(60) Division of application No. 16/380,826, filed on Apr. 10, 2019, now Pat. No. 10,930,426, which is a (Continued)

(30) Foreign Application Priority Data

Aug. 2, 2016 (JP) ................................ 2016-151689

(51) Int. Cl.
*H01F 27/28* (2006.01)
*H01F 1/01* (2006.01)

(Continued)

(52) U.S. Cl.
CPC ........... *H01F 27/2804* (2013.01); *H01F 1/01* (2013.01); *H01F 17/045* (2013.01); *H01F 27/24* (2013.01);

(Continued)

(58) Field of Classification Search
CPC ............ H01F 27/2804; H01F 27/2828; H01F 27/2823; H01F 5/04; H01F 41/04; H01F 41/066; Y10T 29/4902

(Continued)

(56) References Cited

U.S. PATENT DOCUMENTS 5,307,041 A 4/1994 Kato et al.
5,751,203 A 5/1998 Tsutsumi et al.

(Continued)

FOREIGN PATENT DOCUMENTS

JP 2000021651 A 1/2000
JP 201584405 A 4/2015

OTHER PUBLICATIONS

A German Official Notification issued by the German Patent Office, dated Feb. 26, 2019, for related German application No. 10 2017 117 470.2 (10 pages).

(Continued)

*Primary Examiner* — Thiem D Phan
(74) *Attorney, Agent, or Firm* — Law Office of Katsuhiro Arai

(57) ABSTRACT

A manufacturing method of a coil component includes: providing an assembly including a wound-wire part formed by winding, around a core, a conductive wire coated with a coating; and a lead part pulled out outwardly from the wound-wire; removing a portion of the coating from the conductive wire at a location outwardly extending away from the wound-wire part, wherein an entire coating over an entire circumference of the conductive wire at the portion of the coating is removed; providing a terminal electrode with a connecting part; forming a joining part at an end of the coating-removed lead conductive wire to electrically connect the terminal electrode to the lead part via the joining part by irradiating a laser from the connecting part toward (Continued)

the coating-removed lead conductive wire while restricting an irradiation range of the laser within a range where the coated lead conductive wire is not included.

14 Claims, 5 Drawing Sheets

Related U.S. Application Data continuation of application No. 15/663,560, filed on Jul. 28, 2017, now Pat. No. 10,304,613.

(51) Int. Cl.

| | |
|---|---|
| ***H01F 17/04*** | (2006.01) |
| ***H01F 27/24*** | (2006.01) |
| ***H01F 27/29*** | (2006.01) |
| ***H01F 41/066*** | (2016.01) |
| ***H01F 41/10*** | (2006.01) |
| *H01F 3/14* | (2006.01) |
| *H01F 27/26* | (2006.01) |

(52) U.S. Cl.

CPC ......... *H01F 27/292* (2013.01); *H01F 41/066* (2016.01); *H01F 41/10* (2013.01); *H01F 3/14* (2013.01); *H01F 27/263* (2013.01); *Y10T 29/4902* (2015.01)

(58) Field of Classification Search

USPC ................................ 29/602.1, 604, 605, 606

See application file for complete search history.

(56) References Cited

U.S. PATENT DOCUMENTS

| | | | |
|---|---|---|---|
| 8,717,135 B2 | | 5/2014 | Wada et al. |
| 9,009,951 B2 * | | 4/2015 | Chang .................. H01F 27/292 336/200 |
| 9,318,251 B2 * | | 4/2016 | Klesyk .................... H01F 27/32 |
| 10,304,613 B2 | | 5/2019 | Yoshizawa et al. |
| 2007/0188286 A1 | | 8/2007 | Yoshimoto et al. |
| 2008/0143466 A1 | | 6/2008 | Monma |
| 2009/0278652 A1 | | 11/2009 | Shoji et al. |
| 2011/0291783 A1 | | 12/2011 | Yamada et al. |
| 2013/0307657 A1 | | 11/2013 | Ohaga et al. |
| 2014/0285301 A1 | | 9/2014 | Arai et al. |
| 2017/0033762 A1 | | 2/2017 | O'Toole |

OTHER PUBLICATIONS

Non-Final Office Action issued by U.S. Patent and Trademark Office, dated Aug. 10, 2018, for parent U.S. Appl. No. 15/663,560. (11 pages).

Non-Final Office Action issued by U.S. Patent and Trademark Office, dated Jul. 8, 2020, for parent U.S. Appl. No. 16/380,826. (15 pages).

Notice of Allowance issued by U.S. Patent and Trademark Office, dated Jan. 15, 2019, for related U.S. Appl. No. 15/663,560. (9 pages).

Notice of Allowance issued by U.S. Patent and Trademark Office, dated Oct. 21, 2020, for related U.S. Appl. No. 16/380,826. (8 pages).

* cited by examiner

FIG. 1A
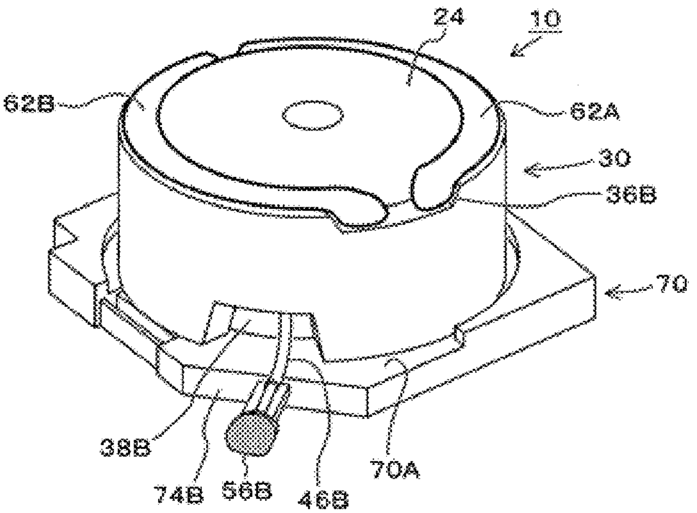
FIG. 1B
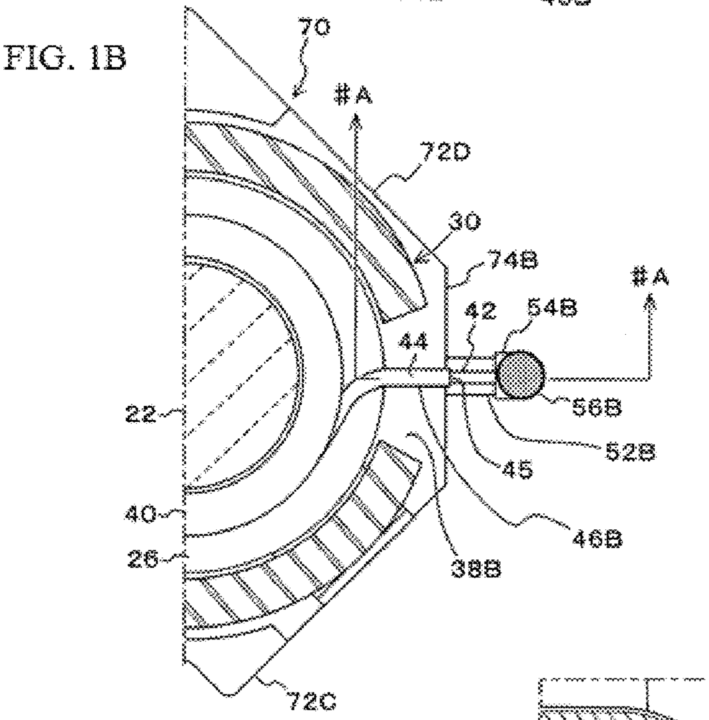
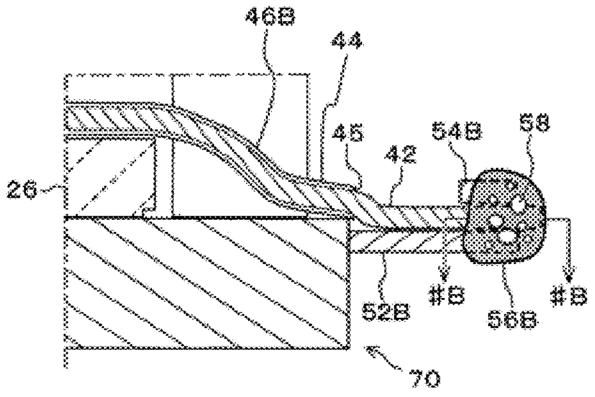
FIG. 1C

MANUFACTURING METHOD OF COIL COMPONENT

CROSS-REFERENCE TO RELATED APPLICATIONS

This application is a divisional of U.S. patent application Ser. No. 16/380,826, filed Apr. 10, 2019, which is a continuation of U.S. patent application Ser. No. 15/663,560, filed Jul. 28, 2017, and claims the benefits thereof under 35 U.S.C. § 120, which claims priority to Japanese Patent Application No. 2016-151689, filed Aug. 2, 2016, each disclosure of which is herein incorporated by reference in its entirety. The applicant herein explicitly rescinds and retracts any prior disclaimers or disavowals made in any parent, child or related prosecution history with regard to any subject matter supported by the present application.

BACKGROUND

Field of the Invention

The present invention relates to coil components, and more specifically, to improving a joining part of a conductive wire and a terminal electrode.

Description of the Related Art

With applications for components growing, demands for stability against environmental fluctuation have been increasing. In particular, the adopted number of electronic components is ever increasing with movement toward computerization in automobiles, and none-breakable components are desired. Therefore, high reliability is demanded for the joining parts of conductive wires and terminals in coil components as well. A conventional joining method of terminals, for example, includes a method described in Patent Literature 1. According to Patent Literature 1, upper and lower surfaces of a base made from an insulating resin are sandwiched by sandwiching parts of the terminal to position a binding part of the terminal integrally molded with the sandwiching part on the base, a drum core is securely attached to the upper surface of the base, and thereafter, a winding wire is wound around the drum core, a lead part of the winding wire is wound around the binding part of the terminal, and then the lead part and the binding part are soldered.

BACKGROUND ART LITERATURES

[Patent Literature 1] Japanese Unexamined Patent Publication No. 2000-021651

SUMMARY

However, in the method of the prior art described above, the winding wire cannot be easily wound around the binding part since the stronger the coated conductive wire used for winding, the larger the diameter of the winding wire becomes. Even if the winding wire can be wound around the binding part, a gap forms between the winding wire and the binding part, and hence problems in miniaturization of components and stability of connection, such as those requiring a large space and lowering adhesion, arise, resulting in imposing restrictions on the thickness of the coated conductive wire, and the like that can be used. Therefore, in the conventional method, it is difficult to use a thick conductive wire, and further, in such a case, to obtain high reliability of the joining part.

The present invention focuses on the above, and has an object of providing a coil component that can be used even in small components while maintaining high reliability of the joining part of a winding wire and a terminal regardless of the thickness of the conductive wire.

Any discussion of problems and solutions involved in the related art has been included in this disclosure solely for the purposes of providing a context for the present invention, and should not be taken as an admission that any or all of the discussion were known at the time the invention was made.

The present invention relates to a coil component characterized by including: a winding wire part formed by winding around a core a conductive wire with a coating covering an outer circumference of the conductive wire; a lead part pulled out toward an outer side of the winding wire part and constituted continuously by the conductive wire with the coating and a conductive wire without the coating; a joining part located on an outer side of the lead part at an end of the conductive wire without the coating; and a terminal electrode electrically connected to the lead part via the joining part.

One of main embodiments is characterized in that the joining part contains voids; and a percentage of the voids is smaller than or equal to 10% with respect to an area of the joining part at a plane that passes through a center of the lead part of the conductive wire and that is parallel to a pull-out direction of the conductive wire.

Another embodiment is characterized in that the conductive wire and the terminal electrode are made from the same material. Further, another embodiment is characterized in that the terminal electrode is made from a Cu plate. Further, another embodiment is characterized in that a heat resistant temperature of the coating is from 125° C. to 180° C. The above-described and other objects, features, and advantages of the present invention should be apparent from the following detailed description and the accompanying drawings.

According to the present invention, joining strength can be obtained without the joining part being affected by the influence of carbonized substance of the coating. Also, since the length of the joining part can be reduced as strength of the wire is increased, the present invention can be used for small components. Further, by setting the percentage of voids contained in the joining part smaller than or equal to a defined percentage, the size of the joining part can be reduced and the length of the joining part can be reduced so that space can be conserved while ensuring mechanical strength of the joining part.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIGS. 1A to 1C are views showing a coil component of an example of the present invention, where FIG. 1A is an outer appearance perspective view, FIG. 1B is a plan view showing a joining part of FIG. 1A, and FIG. 1C is a cross-sectional view cut along line #A-#A of FIG. 1B and seen in a direction of an arrow.

FIG. 2A-1 is a plan view of a drum core, FIG. 2A-2 is a side view of the drum core, FIG. 2B-1 is a plan view of a ring core, FIG. 2B-2 is a side view of the ring core, FIG. 2C-1 is a perspective view seen from a front surface side of a resin base, and FIG. 2C-2 is a plan view showing a back surface side of the resin base.

DESCRIPTION OF THE SYMBOLS

Figures 1, 2A:
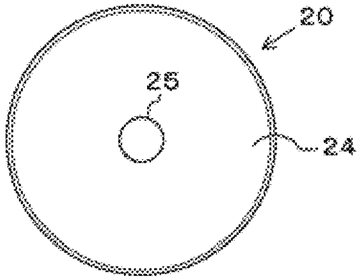
FIGS. 2A-1 to 2C-2 are views showing the example 1, where

10 coil component
20 drum core
22 winding shaft
24, 26 flange part
24A, 26A front surface
25, 27 concave part
30 ring core
30A upper surface
30B bottom surface
30C outer circumferential surface
30D inner circumferential surface
32 through hole
36A, 36B, 38A, 38B groove
40 winding wire
42 conductive wire
44 coating
45 coating end
46A, 46B lead part
47A, 47B conductive wire end
50A, 50B terminal electrode
52A, 52B connecting part
54A, 54B securing part
56A, 56B joining part
58 void
60A, 60B second securing part
62A, 62B first securing part
70 resin base
70A upper surface
70B bottom surface
72A to 72D side surface
74A, 74B side surface
76 projection
C center of drum core
LA length of stripping coating
LB laser irradiation range for joining
LC length of joining part
G gap

DETAILED DESCRIPTION OF EMBODIMENTS

The best mode for carrying out the present invention is described in detail below based on the examples.

Example 1

Figures 2, 2A:
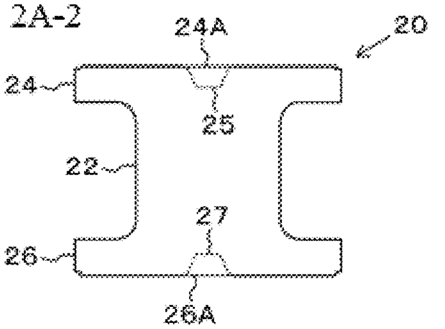
Figures 1, 2B:
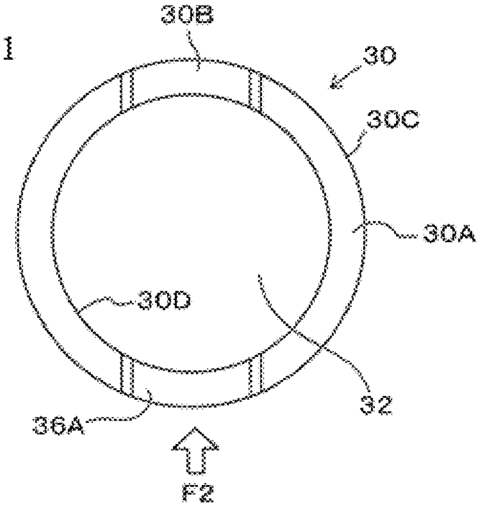
Figures 2, 2B:
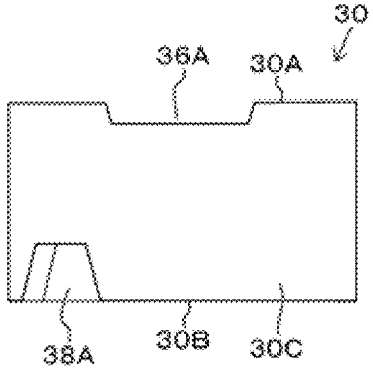
Figures 1, 2C:
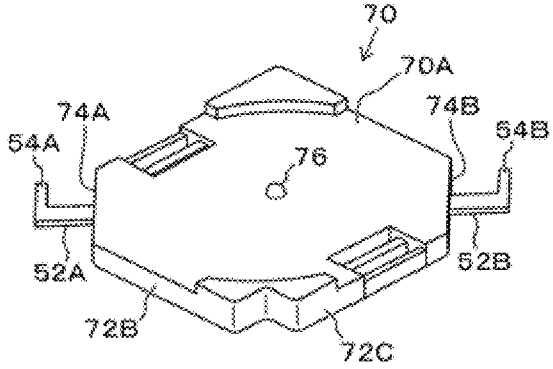
Figures 2, 2C:
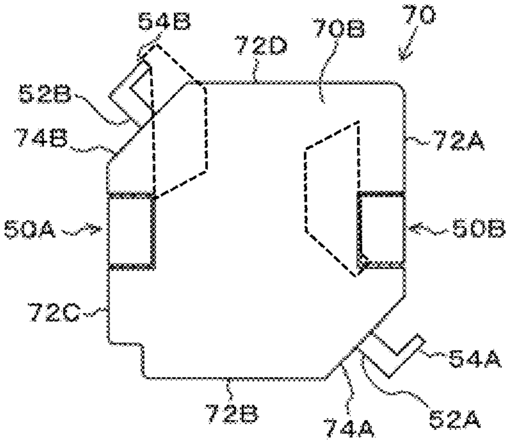
Figure 3A:
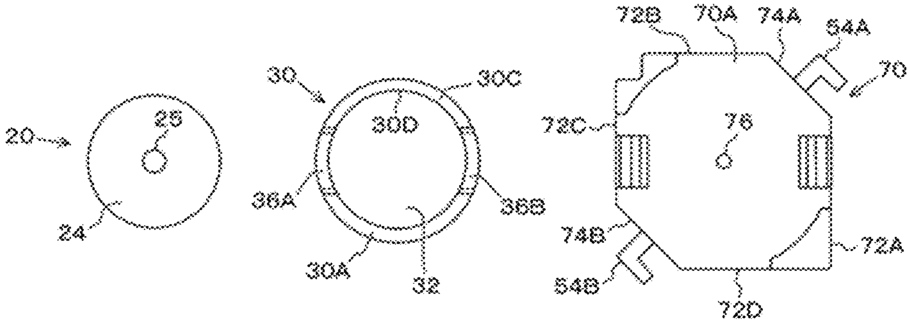
FIGS. 3A to 3E are views showing a manufacturing procedure of the coil component of the example.
Figure 3B:
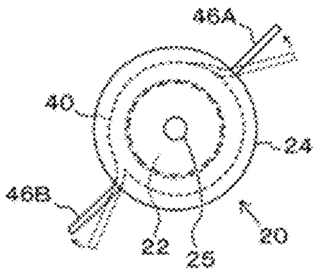

First, an example of the present invention is described with reference to FIGS. 1A to 5C. The present invention relates to a coil component including a joining part that uses a conductive wire with a coating, which includes the coating that covers an outer circumference of the conductive wire, to wind the coated conductive wire around a core, and join an end of the coated conductive wire to a terminal electrode. FIG. 1A shows a coil component constituted by a drum core, around which the coated conductive wire is wound, a ring core that accommodates the wire-wound drum core in a through hole, and also, a resin base that adheres the two cores and fixes the end electrode. FIG. 1A is an external perspective view, FIG. 1B is a plan view showing a joining part of FIG. 1A, and FIG. 1C is a cross-sectional view taken along line #A-#A of FIG. 1B as viewed in the direction of an arrow. FIG. 2A-1 is a plan view of the drum core of the present example, FIG. 2A-2 is a side view of the drum core, FIG. 2B-1 is a plan view of the ring core of the present example, FIG. 2B-2 is a side view of the ring core seen from a direction of arrow F2, FIG. 2C-1 is a perspective view of the resin base seen from a front surface side, and FIG. 2C-2 is a plan view showing a back surface side of the resin base. FIGS. 3A to 4D are views showing a manufacturing procedure of the coil component of the present example, and FIGS. 5A to 5C are plan views showing a length of coating-stripped portion at the joining part of a conductive wire end and a terminal, a laser irradiation range at the time of joining, and the length of the joining part.

As shown in FIGS. 1A and 3A to 3E, a coil component 10 of the present example has a structure in which a drum core 20 is stored in a through hole 32 of a ring core 30, and two types of securing parts 60A, 60B, 62A, 62B are provided between the drum core and the through hole 32, that is, in a gap G between an outer circumference of a flange part of the drum core 20 and an inner circumference of the through hole 32 of the ring core 20. Also, terminal electrodes 50A, 50B connecting to an end pulled out from a winding wire 40 wound around the drum core 20 are provided on a resin base 70 adhered to another flange part 26 of the drum core 20.

Figure 4A:
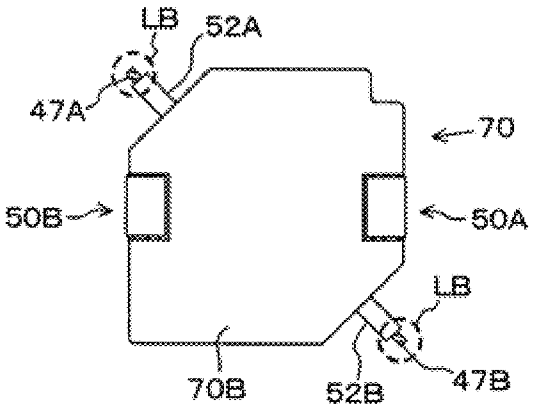
FIGS. 4A to 4D are views showing a manufacturing procedure of the coil component of the example.
Figure 4B:
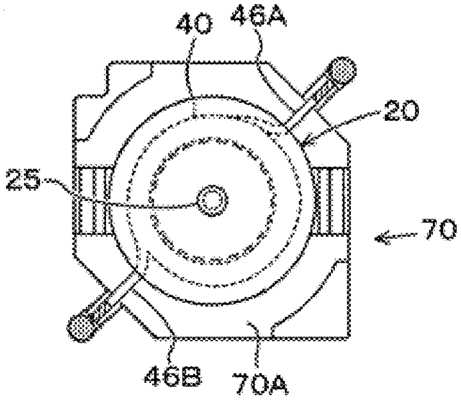
Figure 4C:
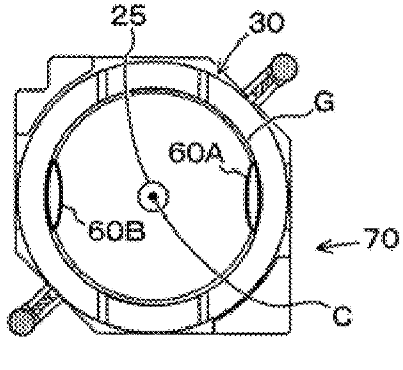
Figure 4D:
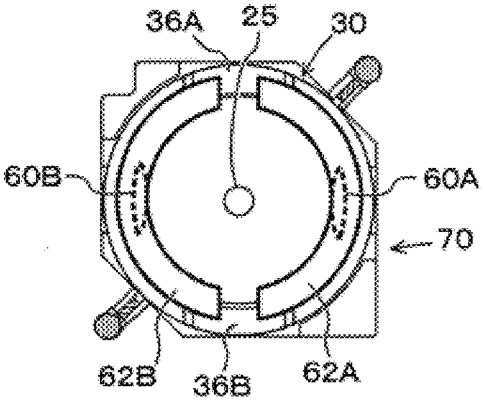
Figure 5C:
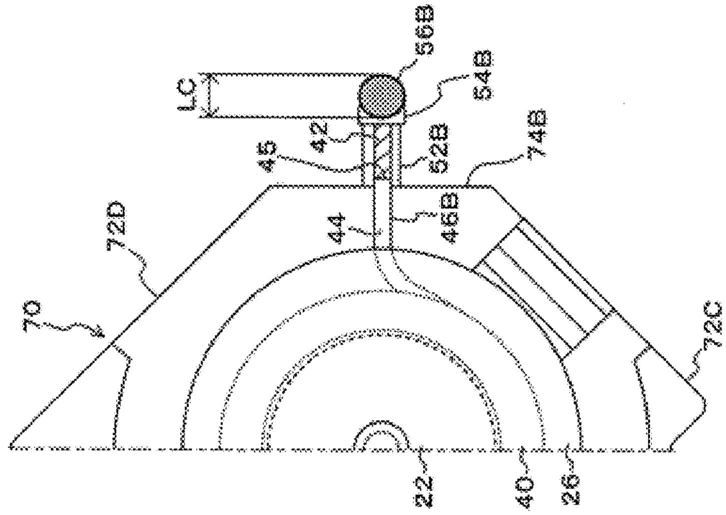
FIGS. 5A to 5C are plan views showing a length of coating-stripped portion at a joining part of a conductive wire end and a terminal, a laser irradiation range for joining, and a length of the joining part.
Figure 5B:
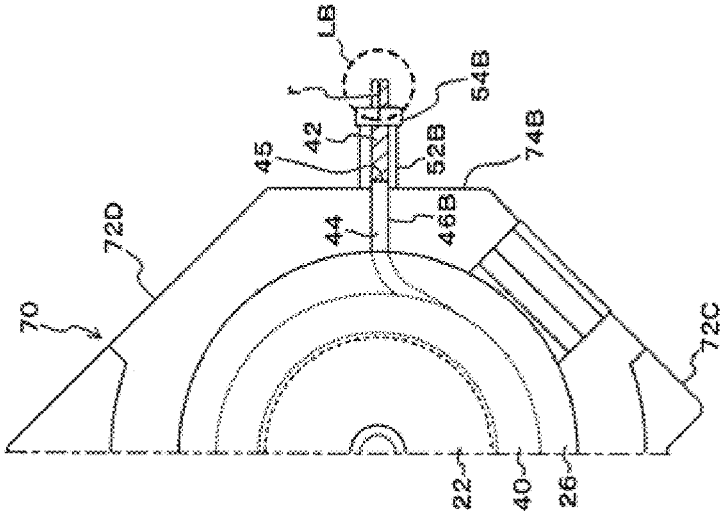
Figure 5A:
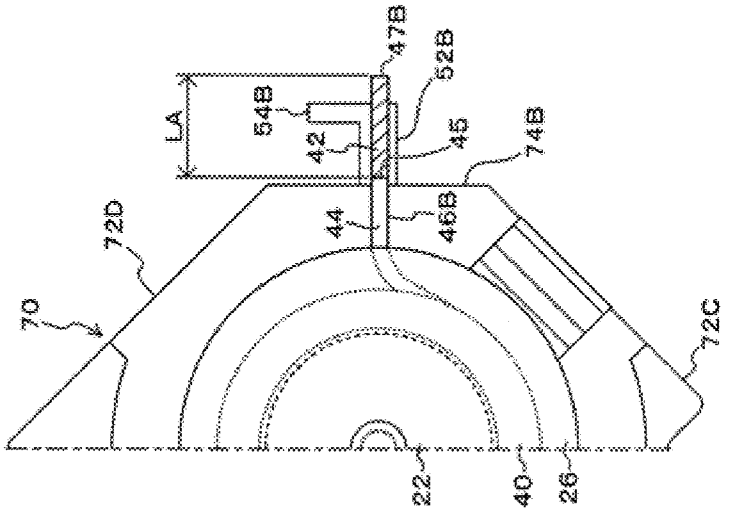

As is schematically shown in FIG. 4C, second securing parts 60A, 60B are provided at two areas so as to face each other with a center C of the flange part 24 of the drum core 20 in between. As shown in FIG. 4D, first securing parts 62A, 62B are provided in an arcuate form so as to cover the portion where the second securing parts 60A, 60B are provided. The first securing parts 62A, 62B merely need to cover the outer side of the second securing parts 60A, 60B, and for example, may be provided in a ring form over the entire circumference. In the present example, second securing parts having a higher hardness than first securing parts are used.

Next, each portion constituting the coil component 10 is described in detail. As shown in FIGS. 2A-1 and 2A-2, the drum core 20 constituting one part of the core includes a pair of flange parts 24, 26 at both ends of a winding shaft 22 around which the winding wire 40 is wound. In the present example, the winding shaft 22 and the flange parts 24, 26 have a roughly circular cross-sectional shape in a direction orthogonal to an axial direction of the winding shaft 22. Concave parts 25, 27 are provided at a central part of the front surface of the flange parts 24, 26. The winding wire 40 has an outer circumference of a conductive wire 42 covered with a coating 44 having an insulation property. Cu, for example, is used for the conductive wire 42, and resin having an upper temperature limit of about 125° C. to 180° C. is used for the coating 44.

As shown in FIGS. 2B-1 and 2B-2, the ring core 30 is a hollow body including the through hole 32 with a roughly circular cross-section, and has a roughly circular outer shape in the present example. In other words, the ring core 30 has a roughly cylindrical shape constituted by an upper surface 30A, a bottom surface 30B, and an outer circumferential surface 30C. A dimension of the inner circumference of the ring core 30 is greater than a dimension of the outer circumference of the drum core 20, where the drum core 20 is stored in the through hole 32 with a gap G. Grooves 38A, 38B for pulling out the conductive wire 42 from the winding wire 40 wound around the drum core 20 are formed on the bottom surface 30B side of the ring core 30. Also, grooves 36A, 36B for increasing the thickness of an adhesive to become the first securing parts 62A, 62B are formed on the upper surface 30A side of the ring core 30.

Next, the resin base 70 is described. The resin base 70 is for mounting one flange part (flange part 26 in the present example) of the drum core 20 thereto, and is provided with terminal electrodes 50A, 50B, which are a pair of metal plates, electrically connected to the conductive wire 42 of the winding wire 40. As shown in FIGS. 2C-1 and 2C-2, the resin base 70 has a predetermined thickness between an upper surface 70A and a bottom surface 70B, and has a shape in which two opposing corners of a square plate-shaped body including side surfaces 72A to 72D, are cut off. In the illustrated example, the side surface 74A is formed between the side surface 72A and the side surface 72B, and the side surface 74B is formed between the side surface 72C and the side surface 72D. The terminal electrodes 50A, 50B are arranged on a mounting-surface side opposite the adhesive surface of the core. The terminal electrodes 50A, 50B are, for example, formed by a Cu plate with a thickness of 0.15 mm performed with Ni/Sn plating. The Ni/Sn plating may be performed only on a substrate side to be mounted on a circuit as a completed product.

Connecting parts 52A, 52B for joining are pulled out from the side surfaces 74A, 74B. The connecting parts 52A, 52B are integrated with one part of the terminal electrodes 50A, 50B, respectively, and electrically connected in the resin base 70 (as illustrated with broken lines in FIG. 2C-2). In other words, a space for joining is formed by chamfering parts of the resin base 70 and providing the side surfaces 74A, 74B. As shown in FIGS. 2C-1 and 2C-2, L-shaped securing parts 54A, 54B orthogonal to an extending direction of the connecting parts 52A, 52B are integrally provided at the distal ends of the connecting parts 52A, 52B. As shown in FIGS. 3(D) and (E), the securing parts 54A, 54B are folded back so as to hold lead parts 46A, 46B of the winding wire 40 between the connecting parts 52A, 52B. The securing parts 54A, 54B are formed to a width of about half the connecting parts 52A, 52B so as to be easily bent. Also, a projection 76 is provided at the middle on the upper surface 70A of the resin base 70, and attachment is carried out while aligning the concave part 27 of the flange part 26 of the drum core 30.

The ends of the winding wire 40 are pulled out onto the connecting parts 52A, 52B, and the lead parts 46A, 46B are sandwiched with the securing parts 54A, 54B. The connecting parts 52A, 52B have a width wider than and up to about three times the thickness of the conductive wire 42 used. According to such a range, only the outside of a coating end 45 is melted with laser to form joining parts 56A, 56B, and conductive wire ends 47A, 47B of the winding wire 40 are connected to the connecting parts 52A, 52B of the terminal electrodes 50A, 50B. In other words, the conductive wire ends 47A, 47B are electrically connected to the terminal electrodes 50A, 50B. The joining parts 56A, 56B contain voids (or air bubbles) 58, as shown in FIG. 1C. The proportion of the voids 58 is smaller than or equal to 10% with respect to an area of the joining part 56B in a plane (cross-section taken along #B-#B in FIG. 1C that passes through the middle of the lead part 46B of the winding wire 40, and that is parallel to the lead part 46B of the conductive wire 42.

Next, one example of a manufacturing method of the coil component 10 of the present example is described with reference also to FIGS. 3A to 5C. First, as shown in FIG. 3A, the drum core 20, the ring core 30, and the resin base 70 described above are prepared. As described above, an electrode plate is embedded in the resin base 70 in advance, where the terminal electrodes 50A, 50B are exposed on the mounting surface side, and the connecting parts 52A, 52B are pulled out from the side surfaces 74A, 74B. Next, as shown in FIG. 3B, the winding wire 40 for example, a round wire with a circular cross-section including the coating 44 is wound around the winding shaft 22 of the drum core 20 so as to overlap the conductive wires along the winding shaft 22 from one side. The winding wire 40 is wound around the circumference of the winding shaft 22, and the lead parts 46A, 46B are pulled out to the outer side of the drum core 20 toward the outer side from the winding shaft 22. As shown in FIG. 3B, the lead parts 46A, 46B are formed so as to coincide with the connecting positions with respect to the terminal electrodes 50A, 50B.

Here, the lead parts 46A, 46B have the heights aligned to lie along the inner side of one flange part 26 of the drum core 20, and are formed so that the conductive wire ends 47A, 47B (lead parts 46A, 46B) are directed in opposite directions toward the outer side in the circumferential direction from the drum core 30. In other words, the conductive wire ends 47A, 47B (and lead parts 46A, 46B) are on a substantially straight line when the other conductive wire end 47B is viewed from the one conductive wire end 47A. When the lead parts 46A, 46B are on a straight line, the stripping of the coating in the next and subsequent steps can be accurately carried out, and the joining stability can be enhanced.

Figure 3C:
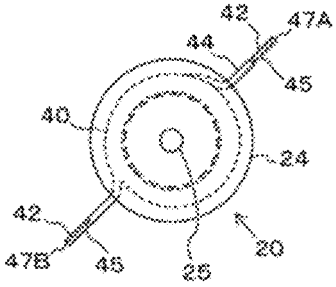
Figure 3D:
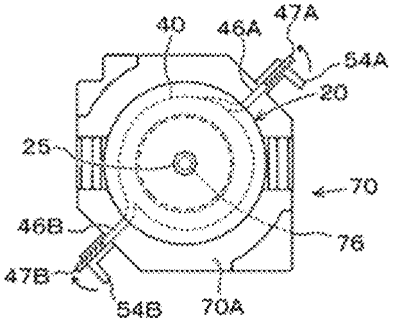

Next, as shown in FIG. 3C, the coating 44 at the position connecting to the terminal electrodes 50A, 50B is stripped from the lead parts 46A, 46B pulled out from the winding wire 40. The stripping of the coating is, for example, carried out by irradiating a green laser from the side surface direction of the lead parts 46A, 46B so as to include ends of the lead parts 46A, 46B of the winding wire 40, and then rotating the wound drum core 20 by 180 degrees and again irradiating the same with laser. Thus, the green laser is irradiated from two directions: one from one side-surface side and the other from the other side-surface side rotated by 180 degrees, so that the coating 44 over the entire periphery of the side surface of the lead parts 46A, 46B at the relevant portion can be substantially removed without any remainder. The green laser here can be energy-adjusted so as to sublimate the coating 44, whereby the stripping can be carried out with satisfactory dimensional accuracy without causing carbonization of the coating 44, and the like. In this case, the stripping is carried out with a determined distance LA to strip from the end 47B of the conductive wire 42, as shown in FIG. 5A so that the irradiation range of the laser used at the time of subsequent joining does not include the end 45 of the coating 44 of after the stripping. Thus, the coating 44 over substantially the entire circumference of the conductive wire 42 on the end side of the lead parts 46A, 46B of the winding wire can be removed by carrying out the laser irradiation from two directions differing by an angle of 180 degrees.

The drum core 20 around which the winding wire 40 is wound and which has the lead parts 46A, 46B from which the coating 44 is stripped in the above-described manner is placed in such a way that a front surface 26A of the flange part 26 faces the upper surface 70A side of the resin base 70, as shown in FIG. 3D. A thermosetting adhesive is applied between the front surface 26A of the flange part 26 and the upper surface 70A of the resin base 70. At this point, the positions of the projection 76 at the middle of the upper surface 70A and the concave part 27 at the middle of the flange part 26 are aligned, and the positions of the lead parts 46A, 46B of the winding wire 40 and the connecting parts 52A, 52B for joining of the resin base 70 are aligned (FIGS. 3D and 5A). After placing the drum core 20 on the resin base 70, the adhesive is cured while applying weight on the drum core 20.

Figure 3E:
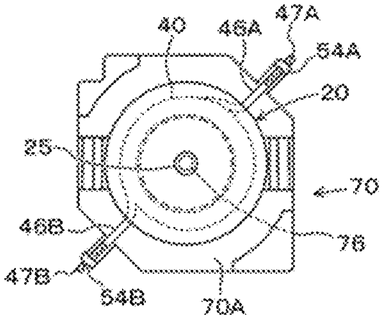

Then, as shown in FIGS. 3E and 5B, the securing parts 54A, 54B are bent-processed, and the lead parts 46A, 46B of the winding wire 40 are sandwiched between the securing parts 54A, 54B and the connecting parts 52A, 52B. The conductive wire ends 47A, 47B and one part of the securing parts 54A, 54B are irradiated with the laser for joining to form the joining parts 56A, 56B, thus joining the conductive wire 42 and the connecting parts 52A, 52B, and carrying out the electrical connection of the conductive wire 42 and the terminal electrodes 50A, 50B. YAG laser, for example, is used for the laser, and the laser is irradiated from the connecting parts 52A, 52B toward the conductive wire 42. In FIG. 4A, the YAG laser is irradiated from a rear direction. The energy of the YAG laser needs to be set high particularly when using thick conductive wire, but even in such a case, the winding wire 40, the lead parts 46A, 46B, and the like can be prevented from being subjected to the influence of reflection of the YAG laser by carrying out the irradiation from the rear direction.

The joining is carried out so that the ends 47A, 47B of the lead parts 46A, 46B of the conductive wire 42, from which the coating is stripped, and one part of the bent securing parts 54A, 54B fall within the laser irradiation range LB for joining. In other words, the laser irradiation range LB for joining is a range where the coating 44 does not exist. It should be noted that the setting of the laser irradiation range LB for joining is indicated with a distance r (see FIG. 5B) from a center of a YAG laser spot. As the coating 44 does not exist in the irradiation range LB, the laser is not reflected by the coating 44 or the like, and the energy can be efficiently absorbed.

It should be noted that the length of the coating to strip refers to the length (see LA of FIG. 5A) from the conductive wire ends 47A, 47B to the coating end 45 where the coating 44 remains, and the irradiation range (LB of FIG. 5B) of the YAG laser is set to a position of making contact with the coating end 45 (which is at the border of the irradiation range, i.e., at a position closest to a point where the coating end 45 is not included in or inside the irradiation range) or not making contact with the coating end 45 in a manner forming a distance between the irradiation range and the coating end 45. As a result, the joining parts 56A, 56B are formed at positions distant from the coating without making contact with the coating end 45. The length of the joining parts 56A, 56B (LC of FIG. 5C; however, joining part 56B side is illustrated and joining part 56A side is omitted) is the length from a portion where the cross-sectional dimension of the conductive wire 42 changes from the lead part 46A, 46B to the distal end of the joining part 56A, 56B. The joining parts 56A, 56B are formed from the conductive wire 42 and one part of the connecting parts 52A, 52B, and the cross-sectional dimension becomes larger from the lead parts 46A, 46B toward the joining parts 56A, 56B. The decomposition of the coating by heat at the time of joining can be suppressed and the formation of the joining parts 56A, 56B is not influenced by sufficiently ensuring the distance from the irradiation range LB of the YAG laser to the coating end 45. Thus, the size of the joining parts 56A, 56B can be reduced. The size may be considered as length, where if the length is short, space required for joining can be reduced, and the above joining structure can also be applied to small components. Also, in the present example, heat transmitted from the terminal electrodes 50A, 50B to the resin base 70 can be lowered, thus preventing deformation and degradation of the resin portion. Moreover, damage to the coating 44 of the conductive wire 42 can be suppressed, and defects such as short-circuit defect of the winding wire part can be prevented. It should be noted that although a distance of −0.5 mm is provided between the coating end 45 and the YAG laser irradiation range LB in the present example, similar effects can be obtained even if a greater distance is ensured. It should be noted that here the length is indicated as positive when the coating end 45 is included in the irradiation range LB of the YAG laser, and indicated as negative when the coating end 45 is not included in the irradiation range LB of the YAG laser. Therefore, a negative value means that a distance is ensured between the coating end 45 and the YAG laser irradiation range LB, and the distance from the irradiation range LB of the YAG laser to the coating end 45 is referred to as a coating end position.

Therefore, if the coating 44 does not exist in the irradiation range LB of the YAG laser, high joining strength can be obtained without being influenced by carbonized substance of the coating 44. The size of the joining parts 56A, 56B themselves can be reduced as the necessary strength is obtained. Also, the joining parts 56A, 56B sometimes contain voids 58 (see FIG. 1C) at the dissolving stage, but the percentage of the voids 58 can be reduced to smaller than or equal to a defined percentage since the joining parts are not affected at least by the influence of gasification of the coating 44. Thus, the size of the joining parts 56A, 56B can be reduced, and the length can be shortened. Accordingly, the mechanical strength of the joining parts 56A, 56B can be ensured while reducing the length of the joining parts 56A, 56B, which leads to conserving space. In the present example, metals constituted by the same material are used for the conductive wire and the terminal electrode. Thus, the dissolution process at the time of joining can be carried out substantially simultaneously, and effects on the peripheral parts other than the joining parts 56A, 56B can be suppressed. It should be noted that Ni/Sn plating or the like is sometimes performed on the terminal electrode, but also in this case, effects on the joining of the Ni/Sn plating are small, and thus, the connection can be similarly carried out as long as the terminal electrode excluding the plated portion is made from the same material as the conductive wire.

After the joining parts 56A, 56B are formed in the above manner (FIG. 4B), the ring core 30 is disposed on the resin base 70 so that the drum core 20 is stored in the through hole 32 of the ring core 30, as shown in FIG. 4(C). Thermosetting resin is applied between the ring core 30 and the resin base

70. Position adjustment of the drum core 20 and the ring core 30 is carried out by image recognition. In this state, as shown in FIG. 4C, a UV adhesive is applied to two points between the outer circumferential surface of the flange part 24 of the drum core 20 and the inner circumferential surface of the ring core 30 using a dispenser from the upper surface side of the drum core 20, that is, the side opposite the mounting surface (upper surface 24A side of the flange part 24 in the present example), and cured with a UV lamp.

The applied and cured UV adhesive becomes second securing parts 60A, 60B. The second securing parts 60A, 60B are fixed at the position where the drum core 20 and the ring core 30 are positioned. Thus, their positional changes from the set positions of the drum core 20 and the ring core 30 during transportation of the component between subsequent steps, during an environmental test, or the like thus can be suppressed. Also, in the illustrated example, the securing parts are arranged at plural areas (two areas), and located at positions facing each other with respect to the center C of the drum core 20, so that the stress exerted on the ring core 30 also becomes even.

Lastly, as shown in FIG. 4D, the thermosetting adhesive is applied using a dispenser so as to cover the upper surface (outer side) of the second securing parts 60A, 60B in the gap G between the drum core 20 and the ring core 30, and cured at 150° C. The cured thermosetting adhesive becomes first securing parts 62A, 62B. Also, according to such thermosetting step, the thermosetting adhesive applied between the drum core 20 and the ring core 30, and the resin base 70 is also cured, so that the drum core 20 and the ring core 30 and the resin base 70 are adhered.

As the first securing parts 62A, 62B cover the second securing parts 60A, 60B, the thickness in the height direction of the first securing parts 62A, 62B can be ensured at a portion which does not overlap the second securing parts 60A, 60B and which makes contact with the outer circumferential surface of the drum core 20. Also, the portion where the thickness is ensured can be made long and defects such as stripping can be suppressed by setting the length of the portion making contact with the first securing parts 62A, 62B and the outer circumferential surface of the drum core 20 long. Thus, the proportion of the length of the portion making contact with the first securing part 62 and the outer circumferential surface of the drum core 20 is preferably greater than or equal to 60% with respect to the length of the outer circumferential surface of the drum core 20.

It should be noted that with respect to the overlapping portion of the first securing parts 62A, 62B and the second securing parts 60A, 60B, the length of the portion making contact with the second securing parts 60A, 60B and the outer circumferential surface of the drum core 20 is included in the length of the portion making contact with the first securing part 62 and the outer circumferential surface of the drum core 20. In the present example, two types of adhesives are used, where adhesive with high hardness after curing is used for the adhesive to become the second securing parts 60A, 60B, and adhesive with low a linear coefficient of expansion after curing is used for the adhesive (thermosetting adhesive) to become the first securing parts 62A, 62B.

<Trial models> Trial models according to the present example are described. Coil components of comparative models 1 and 2 and trial models 1 to 8 were produced under the conditions shown in table 1 below, and the percentage of voids (%) as well as the strength min value (N) were checked. The coil component was a winding wire type inductor having dimensions of 12.5×12.5×6 mm, where Ni—Zn ferrite was used for the drum core 20 and the ring core 30, which are magnetic bodies. Also, a conductive wire (conductive wire itself is Cu) of φ0.4 mm with a polyamide imide coating was used for the winding wire 40, and the number of windings was 10.5.

Also, UV adhesive having a hardness of 40 to 65 Shore D was used as an adhesive that can be cured in a short period of time with respect to the second securing parts 60A, 60B, and epoxy resin adhesive having a hardness of 30 or 40 Shore D was used as a thermosetting adhesive for the first securing parts 62A, 62B and the adhesion of the resin base 70 and the two cores. The resin base 70 having outer shape dimensions (maximum portion) of 12.5×12.5 mm and a thickness of 1 mm made from epoxy resin having a heat resistance property of higher than or equal to 150° was used. As the terminal electrodes 50A, 50B, a Ni/Sn-plated Cu plate having a thickness of 0.15 mm, which was embedded in the resin base 70, was used. The laser used for joining was a green laser (wavelength 532 nm).

It should be noted that with respect to the coating length, the positional relationship between the end 45 of the coating 44 and the irradiation range LB of the YAG laser was determined as positive length when the end of the coating is within the range, and as negative length when the end of the coating is outside the range. The end 45 of the coating 44 is determined by the difference in color caused by the presence or absence of the coating 44. The length of the joining part is the length from the portion where the cross-sectional dimension of the conductive wire 42 changes from the lead parts 46A, 46B to the distal end of the joining part 56A, 56B. The joining parts 56A, 56B can easily be determined because the cross-sectional dimension increases from the lead parts 46A, 46B toward the joining parts 56A, 56B.

Next, with respect to the voids 58, the joining parts 56A, 56B were subjected to image processing based on a cross-sectional photograph obtained by the SEM observation of a plane that passes through the center of the lead parts 46A, 46B of the conductive wire 42 and that is parallel to the pull-out direction of the conductive wire 42, where dark portions were taken as voids 58 and light portions were taken as portions other than voids 58 according to the shading of the contrast of the image, and the percentage of voids 58 with respect to the cross-sectional area of the joining parts 56A, 56B was obtained. The size of the voids 58 was magnified by 50 times, and their areas were converted to areas of circles by image processing, where the diameter of circles greater than or equal to 10 μm were selected, and the sum of their areas was taken as the area of the voids 58. In a strength evaluation of the joining parts, the lead part was pulled toward the inner side direction from the joining part and the strength at which the joining part broke was measured. In the measurement, the respective minimum values (min values) were used at n=20 for the comparative models and the trial models. It should be noted that the inner side direction is the direction viewed toward the drum core from the outer side, the outer side being the side surface of the ring core.

TABLE 1

| WIRE DIAMETER [mm] | | TERMINAL | COATING END POSITION [mm] | VOID [%] | LENGTH OF JOINING PART [mm] | STRENGTH MIN VALUE [N] |
|---|---|---|---|---|---|---|
| 0.6 | COMPARATIVE MODEL 1 | Cu | 0.3 | 45 | 0.90 | 4.8 |
| 0.6 | TRIAL MODEL 1 | Cu | 0.0 | 30 | 0.70 | 6.0 |
| 0.6 | TRIAL MODEL 2 | Cu | −0.2 | 10 | 0.60 | 6.4 |
| 0.6 | TRIAL MODEL 3 | Cu | −0.5 | 2 | 0.58 | 6.6 |
| 0.6 | TRIAL MODEL 4 | PHOSPHOR BRONZE | −0.5 | 5 | 0.64 | 6.0 |
| 0.2 | COMPARATIVE MODEL 2 | Cu | 0.3 | 40 | 0.31 | 1.5 |
| 0.2 | TRIAL MODEL 5 | Cu | 0.0 | 28 | 0.23 | 1.9 |
| 0.2 | TRIAL MODEL 6 | Cu | −0.2 | 8 | 0.19 | 2.0 |
| 0.2 | TRIAL MODEL 7 | Cu | −0.5 | 2 | 0.18 | 2.2 |
| 0.2 | TRIAL MODEL 8 | PHOSPHOR BRONZE | −0.5 | 4 | 0.21 | 1.8 |

The following were confirmed from the results of the comparative models and the trial models shown in Table 1. It should be noted that the wire diameter was φ0.6 mm in Comparative Model 1 and Trial Models 1 to 4, the wire diameter was φ0.2 mm in Comparative Model 2 and Trial Models 5 to 8, and the material of the terminals and the coating end position were matched, respectively, in Comparative Model 1 and Trial Models 1 to 4, and in Comparative Model 2 and Trial Models 5 to 8.

In Comparative Model 1, conductive wire 42 of φ0.6 mm was used, Cu, which is the same material as conductive wire 42, was used for the terminal electrodes 50A, 50B, and the coating end position was 0.3 mm (coating end 45 was included in the YAG laser irradiation range LB). According to the result, the non-coated part, where coating was stripped, melted first, and a black, discolored trace remained at the coated part. This was due to carbonization of the coating 44, where when such part exists, peeling easily occurs from the affected (carbonized) part, and hence sufficient strength of the joining part cannot be obtained, leading to variation in strength. Thus, to ensure the strength to be no less than the minimum value, the length of the joining part is made long as a result.

In Trial Model 1, conductive wire 42 of φ0.6 mm was used, Cu, which is the same material as the conductive wire 42, was used for the terminal electrodes 50A, 50B, and the coating end position was 0.0 mm (closest position of the coating end 45 without being included in the YAG laser irradiation range LB). According to Trial Model 1, stable joining was enabled by carrying out the joining in a range where the end 45 of the coating 44 does not interfere with the joining parts 56A, 56B. The length of the joining part was thus shortened and sufficient strength was still obtained. Also, the power required for joining can be reduced to half compared to the conventional power, so that damage to the coating 44 can be suppressed, eliminating influence on the winding wire part.

In Trial Model 2, conductive wire of φ0.6 mm was used, Cu, which is the same material as the conductive wire 42, was used for the terminal electrodes 50A, 50B, and the coating end position was −0.2 mm (coating end 45 is spaced apart by 0.2 mm from the YAG laser irradiation range LB). According to Trial Model 2, satisfactory stability was obtained and sufficient strength was obtained even if the length of the joining part was reduced. Trial Model 3 was produced like Trial Model 2 except that the coating end position was −0.5 mm (coating end 45 is spaced apart by 0.5 mm from the YAG laser irradiation range LB). According to Trial Model 3, the proportion of the voids 58 was reduced and the length of the joining part was reduced while maintaining high strength of the joining part by further separating the coating end 45 from the YAG laser irradiation range LB. It should be noted that comparing the results of −0.2 mm and −0.5 mm, no large difference is found other than in the proportion of the voids 58, and hence, even if a conductive wire 42 of φ0.6 mm is used, it is deemed sufficient if the coating end 45 is separated by 0.5 mm from the YAG laser irradiation range LB, and no effective difference is likely to occur even if the coating end is further separated.

Trial Model 4 was produced like Trial Model 3 except that phosphor bronze, which is a material different from the conductive wire 42, was used for the terminal electrodes 50A, 50B. In Trial Model 4, the shapes of the joining parts 56A, 56B were unstable. This was because the phosphor bronze melted first (conductive wire 42 is Cu) and the conductive wire 42 melted thereafter, and hence the time for irradiating the laser at the time of joining was longer, although slightly. Thus, the melted amount increased due to the increase in operating time, and the length of the joining part became longer than in Trial Model 3.

Comparative Model 2 and Trial Models 5 to 8 were the same as Comparative Model 1 and Trial Models 1 to 4 except that the conductive wire 42 was φ0.2 mm, and similar evaluation was obtained. It should be noted that in the case of a thin conductive wire 42, the energy required for joining may be low as the conductive wire 42 can be easily melted. In this case, the terminal electrodes are desirably melted at low energy, where in one method, phosphor bronze is used so that the phosphor bronze can be melted first, as shown in Trial Model 8. This is adopted when the coating 44 is thin on thin conductive wire 42, so that the coating is less likely to be damaged by heat.

As discussed above, according to Example 1, the following effects can be obtained:

(1) In the coil component 10 including the winding wire part 40 formed by winding the conductive wire with a coating, the joining parts 56A, 56B at the end of the conductive wire 42, and the terminal electrodes 50A, 50B electrically connected to the conductive wire 42 by the joining parts 56A, 56B, conductivity can be reliably realized since the coating 44 of the conductive wire 40 and the joining parts 56A, 56B are not brought into contact. Also, the length of the joining parts can be shortened because strength is manifested, thereby conserving space.

(2) The joining parts 56A, 56B contain the voids (or air bubbles) 58, the percentage of which voids 58 is smaller than or equal to 10% with respect to the cross-sectional area of the joining parts 56A, 56B at a plane that passes through the center of the lead parts 46A, 46B of the conductive wire 42 and that is parallel to the pull-out direction of the conductive wire 42. Thus, strength can be increased, and furthermore, the length of the joining part can be reduced by suppressing the presence of the voids 58. Moreover, because the volume of the joining part can be reduced, thereby reducing the overall volume of the component, the above joining structure can be applied to small components without using wasted space.

(3) With the use of Cu for the conductive wire 42 and the terminal electrodes 50A, 50B (and connecting parts 52A, 52B), connection can easily be realized even if the conductive wire is thick. This is because at the time of joining of the lead parts 52A, 52B and the conductive wire 42, their heat absorption rates and their temperature changes by laser irradiation can be made the same, and the respective parts can be melted by the same timing, which also leads to shape stability of the joining part.

(4) The upper temperature limit of the coating 44 of the conductive wire 42 is 125° C. to 180° C., and thus high temperature can be used. This is because the coating 44 is made less vulnerable to damage by the heat of the joining parts 56A, 56B, and the insulation degradation of the lead parts 46A, 46B and the winding wire 40 can be prevented.

It should be noted that the present invention is not limited to the above examples, and various changes can be made within a scope not deviating from the gist of the invention. This includes, for example, the following:

(1) The shapes and dimensions shown in the above examples are each merely an example, and may be appropriately changed as needed. For example, the cross-sectional shape of the outer shape of the ring core 30 is a circle in the examples, but may be an octagon, a square, and the like, or may be a shape in which a corner is rounded to an extent where rotation does not occur.

(2) The ranges to strip the coating described in the above examples also are each merely an example, and can be appropriately changed within a scope in which equivalent effects can be obtained, depending on the thickness of the conductive wire, and the irradiation range and output of the laser for joining used for the joining. The length to strip the coating (the length from the end of the conductive wire to the end of the coating) merely needs to be such that the end 45 of the coating 44 is positioned where the end of the coating does not interfere with the joining part of the conductive wire extending thereafter and the lead part of the terminal electrode. Also, the irradiation power of the laser for joining used for the joining at this time may be set to a range in which the conductive wire is not damaged.

(3) The pull-out structures of the winding wire 40 from the ring core 30 shown in the above examples also are each merely an example, and can be appropriately changed as a matter of design change within a scope in which equivalent effects can be obtained.

(4) In the example described above, the conductive wire 42 and the terminal electrode 50 are made from the same material, but this is merely one example, and a metal that melts more easily than the conductive wire may be used for the terminal electrodes, as shown in Trial Model 8 described above, depending on the thickness of the conductive wire.

(5) The shapes of the terminal electrodes 50A, 50B and the joining modes with the lead parts 46A, 46B of the winding wire 40 using the resin base 70 shown in the above examples also are each merely an example, and can be appropriately changed as a matter of design change within a scope in which equivalent effects can be obtained.

(6) In the above examples, two second securing parts 60A, 60B are provided, but this is also merely an example, and the number and arrangement can be appropriately changed as long as two or more second securing parts are provided.

(7) The resin bases 70 shown in the above examples also are each merely also an example, and the material, shape, or the like may be appropriately changed within a scope in which equivalent effects can be obtained.

(8) In the above examples, the first securing parts 62A, 62B are provided to completely cover the upper surfaces of the second fixing parts 60A, 60B, but this is merely an example, and the first securing parts do not necessarily need to cover the entire second securing parts, and may partially cover the second securing parts. The second securing parts 60A, 60B merely need to be at least brought into contact with either one of the first securing parts 62A, 62B. In either mode, the first and second securing parts will not detach from the component.

According to the present invention, in a coil component including a winding wire part in which a conductive wire with a coating is wound, a joining part located at an end of a lead part of the conductive wire, and a terminal electrode electrically connected with the conductive wire by the joining part, the coating and the joining part are separated. Thus, joining strength can be obtained without receiving the influence of carbonized substance of the coating. Also, the length of the joining part can be shortened because sufficient joining strength thereof is manifested, so that the above joining structure can be applied to a coil component for small components. In particular, application to such coil component in the fields of automobiles and industrial machines is suitable as it excels in temperature resistance and impact resistance.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A manufacturing method of a coil component, comprising:

providing an assembly comprising: a wound-wire part formed by winding, around a core, a conductive wire coated with a coating covering an outer circumference of the conductive wire; and a lead part pulled out outwardly from the wound-wire part and constituted by the coated conductive wire outwardly extending continuously from the wound-wire part, referred to as a coated lead conductive wire, away from the wound-wire part as viewed in an axial direction of the wound-wire part;

removing a portion of the coating from the conductive wire with the coating to form a conductive wire without a coating, referred to as a naked lead conductive wire, at a location further outwardly extending continuously from a remaining portion of the conductive wire with coating, referred to as a coated lead conductive wire, and further away from the wound-wire part than the coated lead conductive wire as viewed in the axial direction of the wound-wire part, wherein an entire coating over an entire circumference of the conductive wire at the portion of the coating is removed;

providing a terminal electrode with a connecting part extending from the terminal electrode;

forming a joining part at a location on an outer side of the lead part at an end of the naked lead conductive wire, and further away from the wound-wire part and the naked lead conductive wire as viewed in the axial direction of the wound-wire part so as to electrically connect the terminal electrode to the lead part via the joining part where a portion of the naked lead conductive wire is fused to and electrically connected to the connecting part by irradiating a laser from the connecting part toward the naked lead conductive wire while restricting an irradiation range of the laser within a range where the coated lead conductive wire is not included.

2. The method according to claim 1, wherein the connecting part is provided with a securing part for securing the naked lead conductive wire to the connecting part, and before forming the joining part, the securing part is bent-processed to sandwich and fix a portion of the naked lead conductive wire to the securing part and the connecting part.

3. The method according to claim 2, wherein an end of the naked lead conductive wire and a part of the securing part are irradiated with the laser to form the joining part.

4. The method according to claim 3, wherein the connecting part and the securing part are constituted by a metal plate.

5. The method according to claim 1, wherein the connecting part is constituted by a material which is the same as a material constituting the naked lead conductive wire, or which is more easily melted than is the material constituting the naked lead conductive wire.

6. The method according to claim 1, wherein the joining part contains voids which are bubbles wherein a percentage of the voids is smaller than or equal to 30% as measured with respect to an area of the joining part at a plane that passes through a center of the lead part of the conductive wire and that is parallel to a pull-out direction of the conductive wire and orthogonal to an axis of the core.

7. The method according to claim 6, wherein the percentage of the voids is smaller than or equal to 10%.

8. The method according to claim 1, wherein the laser is irradiated to form the joining part in a manner keeping the joining part away from the coated lead conductive wire.

9. The method according to claim 1, wherein the joining part is formed by a portion of the naked lead conductive wire and a portion of the connecting part, wherein a cross-sectional area of the joining part is greater than a combined cross-sectional area of the naked lead conductive wire and the connecting part between the joining part and the lead part.

10. The method according to claim 1, wherein the conductive wire and the terminal electrode are made from the same material.

11. The method according to claim 1, wherein the terminal electrode is made from a Cu plate.

12. The method according to claim 1, wherein a heat resistant temperature of the coating is 125° C. to 180° C.

13. The method according to claim 1, wherein the coating of the coated lead conductive wire manifests substantially no carbonization of the coating.

14. The method according to claim 1, wherein the lead part, the joining part, and the terminal electrode are referred to as the first lead part, the first joining part, and the first terminal electrode, respectively, wherein the coil component further comprises a second lead part corresponding to the first lead part, a second joining part corresponding to the first joining part, and a second terminal electrode corresponding to the first terminal electrode, which are formed in the same manner as that defined in claim 1.

* * * * *